Jan. 24, 1933.   F. E. HERR   1,895,326
VALVE APPARATUS
Filed March 17, 1930
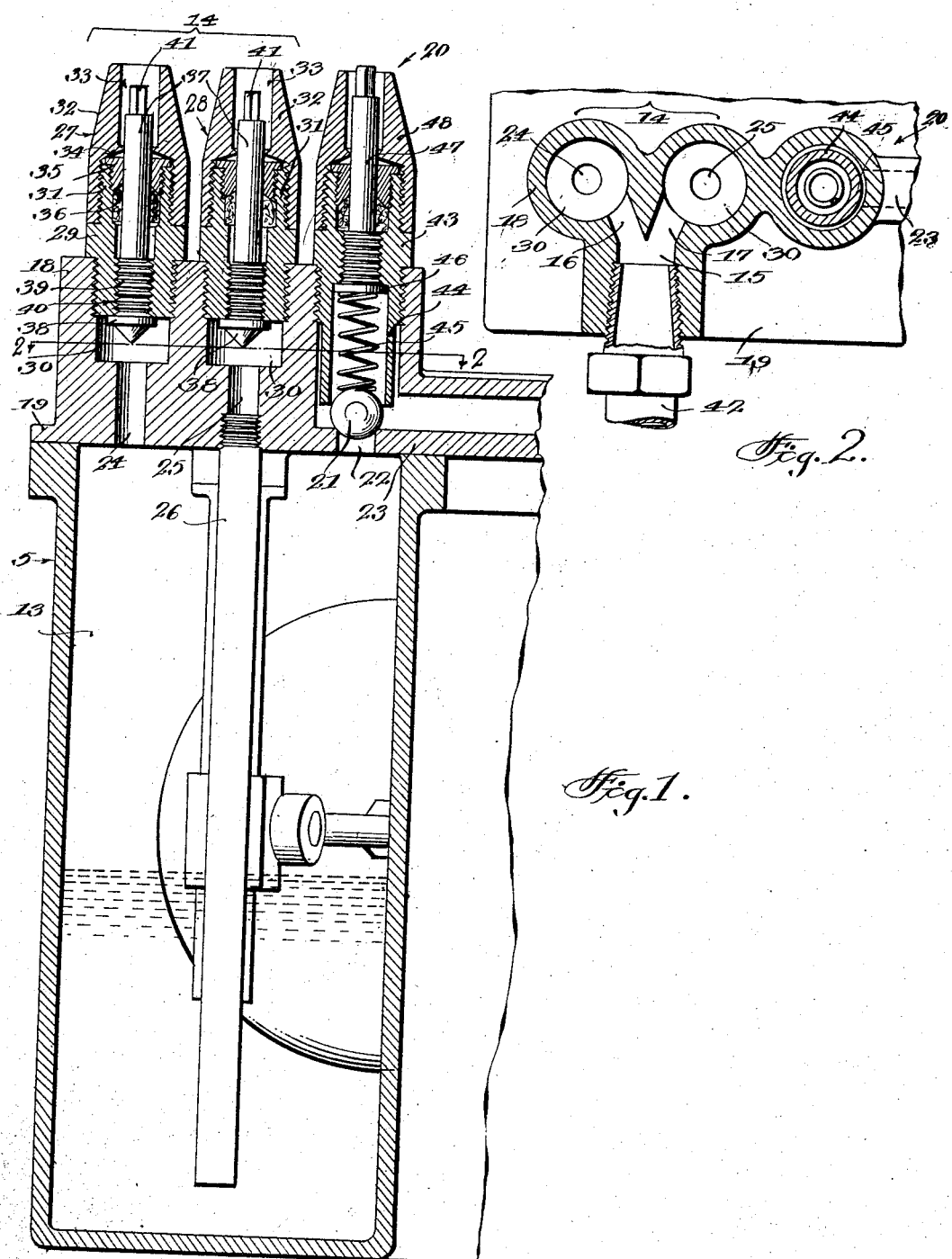

Patented Jan. 24, 1933

1,895,326

UNITED STATES PATENT OFFICE

FRANK E. HERR, OF LANCASTER, PENNSYLVANIA

VALVE APPARATUS

Application filed March 17, 1930. Serial No. 436,606.

This invention relates to improvements in valves, a particular purpose being to provide a valve apparatus especially adaptable to oil burners but not confined to such use, and it consists of the constructions, combinations and arrangements herein described and claimed.

An object of the invention is to provide a triple valve assemblage of which the individual valve components are separately adjustable to meet the various kinds and conditions of fluids required to be controlled thereby.

Another object of the invention is to provide an individual valve component which with but little modification can be made to serve either as a fluid control valve or a pressure relief valve.

A further object of the invention is to provide a combined air and oil mixing and excess pressure relief valve, the mixing valve functioning regularly within a given pressure range which when exceeded is relieved by the relief valve.

Other objects and advantages will appear in the following specification, reference being had to the accompanying drawing in which Figure 1 is a vertical section of the valve apparatus as well as of a part of an oil burner in which connection it is used, parts being shown in elevation.

Figure 2 is a detail horizontal section taken substantially on the line 2—2 of Figure 1.

It has been stated that the valve apparatus is of general application, it not necessarily being confined to use in an oil burner in which connection it is herein described principally for the purpose of illustration. The valve apparatus is a composite of a twin mixing valve originally claimed in a United States application known as Case No. 2 filed by Frank E. Herr, January 19, 1929, Serial No. 333,622, and a certain air relief valve also disclosed in said application, the composite disclosed or triple form of the valve being disclosed but not claimed in an application filed by Frank E. Herr in Canada, September 26, 1929, Serial No. 355,702.

An oil burner with which the valve apparatus is intended to be used may be of the type disclosed in a United States application known as Case No. 1 filed by Frank E. Herr, August 9, 1928, Serial No. 298,568. The latter application as well as the others, employs a control tank generally designated 5 of which only the secondary or high pressure chamber 13 is herein shown.

This chamber contains oil and air introduced as a mixture by a pump (not shown). The oil and air separate so that there is a stratum of oil on the bottom and a stratum of air under pressure above the oil. A twin mixing valve generally designated 14 receives the foregoing constituents and causes them to be reconverted into a mixture or spray by confluence in a mixing chamber 15 (Fig. 2) to which the air and oil are supplied by ducts 16, 17.

Situated beside the twin mixing valve 14 and fastened to a block 18 on a cover 19 common to all of the valves, is a pressure relief valve generally designated 20. This valve includes a ball 21, pressed toward its seat upon an air port 22 from which it is adapted to be raised by excessive air pressure in the secondary chamber 13 to enable an escape into an air conduit 23 which is incorporated in the cover and extends elsewhere. The conduit has an air hole (not shown) at a remote point, and while an escape of air to atmosphere is permitted yet the conduit confines such oil as condenses within it to avoid a collection of the oil on top of the cover 19.

Holes 24, 25 in the cover 19 are respectively for the entrance of air under pressure and oil from the chamber 13, a pipe 26 being screwed into the hole 25 for the latter purpose. The components 27, 28 of the twin mixing valve 14, respectively for controlling the flow of air and oil of the mixing chamber 15 (Fig. 2), are identical in every respect, hence the description of one will suffice for both, similar characters referring to corresponding parts.

A gland 29 is screwed into the upper end of a bore 30, of which the hole 24 is a counter bore, extending down approximately mid-way so as to define an entrance chamber with which the duct 16 (Fig. 2) has communication.

An upstanding sleeve 31 of the gland 29 has a thimble 32 screwed thereupon, the bore 33 of the thimble being sufficiently undersize to define a shoulder 34 which presses upon the flange of a retainer 35 to keep the packing 36 under pressure.

The stem 37 of a valve member 38 works in the retainer 35 and packing 36. The stem has a threaded portion 39 which screws in a correspondingly threaded portion 40 of the gland 29. The upper end of the stem 37 is made non-circular at 41 to receive a clock key or other wrench by which adjustments are to be made.

The thimble 32 constitutes a shield for the stem 37. Were the stem exposed, an inadvertently directed blow might so bend it that further needed adjustment would be impossible and the replacement by an entirely new valve component would be necessary. However, the thimble is of a more sturdy construction and encompasses the exposed end of the screw stem so well that the possibility of damage to the stem is ordinarily very remote.

Thus far it will be understood that valve member 38 acts on the order of a needle valve. The adjacent edge of the hole 24 comprises its seat and the specific adjustment of the valve member in respect to the hole 24 governs the amount of air under pressure delivered to the mixing chamber 15 (Fig. 2). A similar adjustment of the valve member 38 of the oil component 28 governs the admission of oil to the mixing chamber. The confluence of fluids produces a mixture which is conducted by a spray pipe 42 (Fig. 2) to a burner nozzle not shown.

In reference to the relief valve 20, the gland 43 has a depending sleeve 44 by which the ball 21 will be guided when forced to recede by excessive air pressure. A spring 45 situated in the sleeve 44 bears on the ball at one end and against the head 46 of an adjustable stem 47 at the other end.

The exposed end of this stem is guarded by a thimble 48 in the manner already described in connection with the air valve 27, the remaining structure being identical requires no specific description.

As previously pointed out, the block 18 constitutes the common mounting of the three valve components. This produces a compact arrangement. In addition to its function as a common mounting the block 18 comprises part of a boss on the cover 19 in which the mixing chamber 15 (Fig. 2) is formed.

While the construction and arrangement of the improved valve apparatus is that of a generally preferred form, obviously modifications and changes may be made without departing from the spirit of the invention or the scope of the claims.

I claim:—

1. A twin mixing valve for a control tank adapted to contain air and oil under pressure and having a cover, a boss on the cover having a pair of entrance chambers each with a hole in commuincation with the tank one for air and the other for oil, a mixing chamber also in the boss having ducts directed into the mixing chambers, glands attached to the boss having ends defining one wall of the entrance chambers, and needle valves adjustably carried by the glands in confronting relationship to adjacent edges of the holes for regulating the inflow of air and oil.

2. Valve apparatus for a control tank containing air and oil under pressure and having a cover comprising a twin mixing valve for regulating the outflow of air and oil, a relief valve for relieving the tank of excessive air pressure, and a block formed on the cover constituting a common mounting for each of the valves and disposing them in a compact formation.

3. In a control tank arranged to contain air and oil under pressure and having a cover, valve apparatus for the control tank comprising a boss having three chambers formed therein, each with an opening directed into the tank, a pipe depending from one of the openings and extending into the oil, the remaining two openings being for the escape of air, a twin mixing valve having valve members, of which one member is adjustable in respect to the oil opening and of which the other member is adjustable in respect to one of the air openings, a ball arranged to be seated upon the remaining air opening, and means for yieldably holding the ball to its seat for an escape of air from the tank under excessive pressure.

4. Valve apparatus comprising a pair of similar valve components constituting a mixing valve each having an adjustable valve member, a third valve component having a loose, spring pressed ball valve member, and a block constituting a common mounting for the valve components, each having a chamber receiving the respective valve component and each chamber having an opening the adjacent edge of which may constitute a seat for the respective valve member.

FRANK E. HERR.